3,223,323
MAGNETIC RESET COUNTER MECHANISM
Norman D. Lawless, Flint, and Harold R. Mertz, Grand Blanc, Mich., assignors to General Motors Corporation, Detroit, Mich., a corporation of Delaware
Filed Oct. 4, 1963, Ser. No. 314,022
7 Claims. (Cl. 235—144)

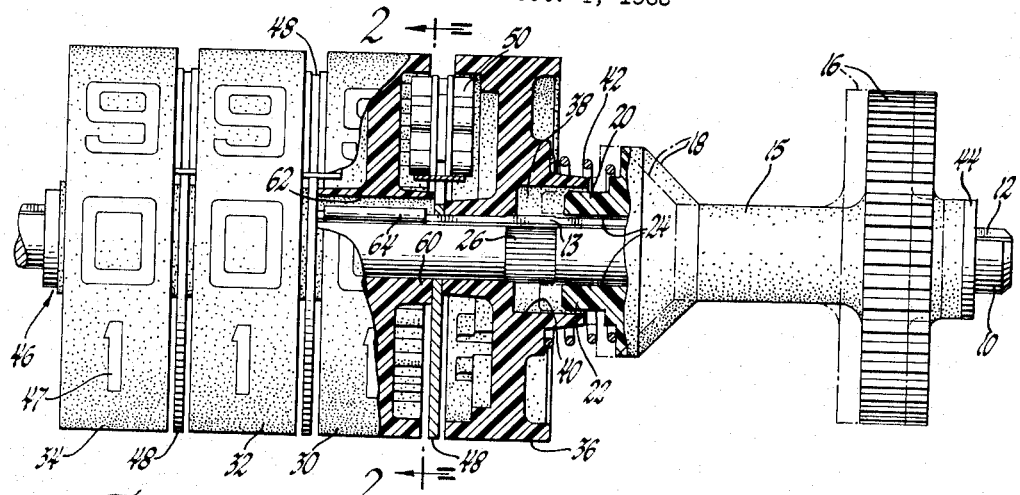
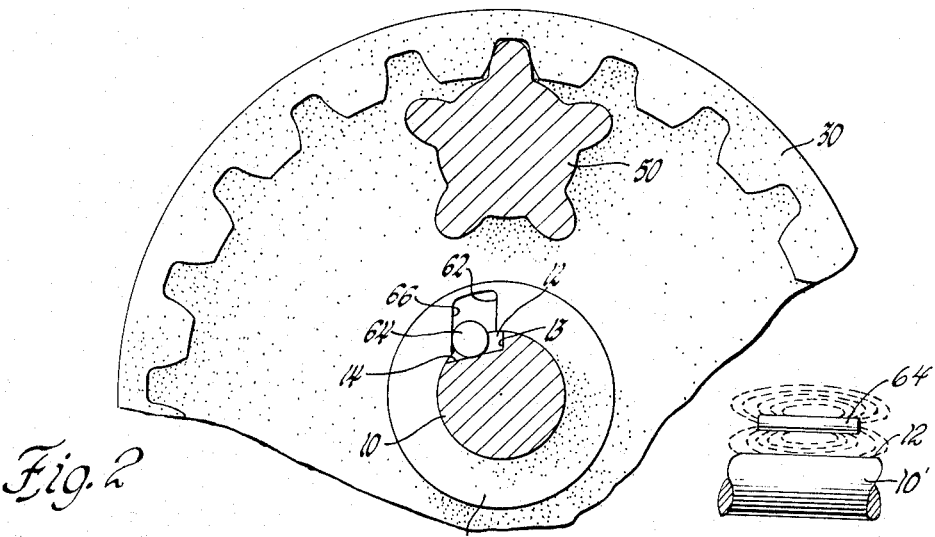
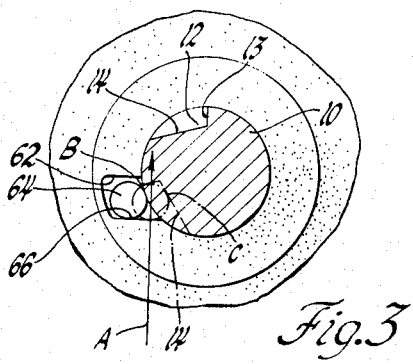
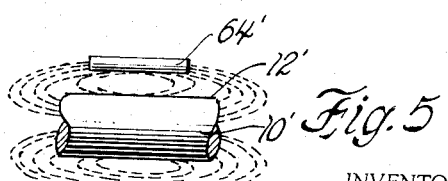
INVENTORS
Norman D. Lawless &
BY Harold R. Mertz
George E. Johnson
ATTORNEY United States Patent Office 3,223,323
Patented Dec. 14, 1965

This invention relates to counting mechanisms and particularly to counting mechanisms such as odometers usually mounted in combination with speedometers of motor vehicles and which are adapted to be reset to their zero reading positions. Mechanisms of this general type have been disclosed in the United States Patent 2,131,622, granted September 27, 1938, in the name of R. O. Helgeby.

An object of the present invention is to provide an improved counter mechanism with a simplified resetting structure of low cost and capable of reliable performance with a minimum of wear and power requirements.

To this end, a feature of the present invention is a counter mechanism having a one-way clutch arrangement between a supporting shaft and a counter wheel, the clutch arrangement including a permanently magnetized pin or shaft adapted to lock the shaft and wheel together for resetting purposes.

This and other important features of the invention will now be described in detail in the specification and then pointed out more particularly in the appended claims.

In the drawings:

FIGURE 1 is an elevation view of a counter assembly with portions broken away better to illustrate the construction;

FIGURE 2 is a partial sectional view looking in the direction of the arrows 2—2 in FIGURE 1 and drawn to a larger scale;

FIGURE 3 is a sectional view of a portion of the structure shown in FIGURE 2 but with the parts in relative positions differing from those in FIGURE 2;

FIGURE 4 is a schematic view of a preferred construction for driving one wheel; and FIGURE 5 is a schematic view of an alternative construction for driving one wheel.

The counter mechanism includes a supporting shaft 10 having a longitudinal groove 12 therein. This groove has its sides in the form of a V, one side 13 being substantially radial to the shaft and the other side 14 being at an obtuse angle with the side 13 to form a cam surface as will more fully appear.

Journaled on the shaft 10 is a drive unit 15 including a gear 16 attached by an intermediate sleeve to a frusto-conical portion 18. The latter bears two prongs 20 and 22 which are relieved at 24 to clear a knurled portion 26 formed on an intermediate portion of the shaft 10. Also journaled on the shaft 10 are units, tens and 100's wheels 30, 32 and 34 respectively. Fixed to the shaft 10 is a first or decimal wheel 36. This wheel is fitted over the knurls 26 with a driving fit so that the shaft 10 and the decimal wheel 36 must turn together. In the assembly, a part of the knurled portion may inadvertently extend from the wheel 36, but the clearance 24 avoids interference. The decimal wheel 36 bears two diametrically opposed recesses 38 and 40. These are adapted freely to receive the two prongs 20 and 22, respectively, as a continuously engaged wheel driving means. A coil spring 42 is placed to urge the drive arrangement 15 to the right as viewed in FIGURE 1 and against a stop washer 44 fixed to the shaft 10. A washer arrangement 46 is fixed to the shaft 10 at the other end of the series of wheels.

All the wheels are made of plastic material and bear indices 47 and the means for transferring rotary motion from the decimal wheel 36 to the other wheels is somewhat conventional and needs no detailed explanation here as it forms no part of the present invention. It suffices to say, however, that such rotary transfer means includes pinion carrying plates 48 each interposed between adjacent wheels and also pinions such as the pinion 50. Equivalent rotary motion transfer means for a series of number wheels is disclosed in the Patent No. 2,131,622, above referred to.

In the journal surface of the hub 60 of the unit wheel 30 is a groove 62. It will be noted that the groove 62 is deep in that it is capable of receiving the entire diameter of a permanently magnetized pin or rolling element 64. This pin is almost as long as the groove 62 and is free to move in the latter and radially with respect to the wheel when urged to do so either by cam action or by magnetic attraction. The groove 12 in the shaft is relatively shallow with a depth not exceeding that of about half of the diameter of the pin 64. It will be noted that a resultant force vector A (FIGURE 3) drawn through the axis of the pin 64 is normal to the surface 66 of the groove 62 when a locking action is achieved. It is essential that a resultant vector (normal to the surface 66 and passing through the axis of the pin 64) pass between a point B on the shaft periphery and a point C where the pin engages the cam surface 14. Because of this resultant vector, the pin is firmly held in the pocket provided by the groove in the shaft. The specific angle of inclination of the surface 62 facing the surface 66 is of no importance functionally except that it must not be at such an angle as to cam the pin 64 out from the shaft groove. Preferably, surfaces 62 and 66 are made parallel. Each of the wheels 32 and 34 is also provided with a groove and permanently magnetized pins but the structure is illustrated only with respect to the unit wheel 30. It will be appreciated that the groove 12 could be made with a curvature conforming with that of the pin; that is, between the points B and C and also that surface 14 could be convex to give an optimum free running operation.

In ordinary operation of the odometer, as illustrated, the gear 16 is driven by the usual speedometer drive arrangement with the result that the prongs 20 and 22 engaging the decimal wheel 36 will cause a rotation of the latter wheel and the shaft 10 in one direction. The pinion carrying plates 48, as is customary in such instruments, do not rotate with the result that the rotary motion will be transferred to succeeding wheels of the series in the customary manner.

If it be assumed, however, that it is desirable to reset the odometer to zero, then the drive arrangement 15 is shifted to the left and against the spring 42 and placing the gear 16 into the position shown by the dot-and-dash lines in FIGURE 1. This causes disengagement of the drive arrangement 15 from the speedometer drive but retains the driving connection with the numbered wheels. Manual rotation, in the reverse direction, of the drive arrangement 15 will, therefore, cause rotation first of the shaft 10 and the decimal wheel 36 and then the rotation of the other number wheels until the zero reading of all the wheels is obtained. This reading may be obtained because of the placement of the groove 12 in the shaft 10 and the one-way clutch action upon each of the wheels 30, 32 and 34.

The magnetic attraction between the pin 64 and the shaft 10 causes the pin always to contact the shaft, but if each wheel is moved in one direction relative to the shaft, the pin has no locking effect as the surface 14 cams the pin into the wheel 62 giving free relative rotation of the shaft wheel. The rotation, in fact, is exceedingly free so that power for driving the odometer may be at a minimum. If, however, the resetting operation is engaged in, which entails the reverse directional rotation of the shaft 10, then we have a situation where the pin for a given wheel will be caught in the groove 12 in the position shown in FIGURE 3 by dot-and-dash lines. With this situation obtaining, the clutch engaging function is performed and that wheel and the succeeding wheels may quickly and easily be set back to their zero positions.

The preferred construction is illustrated and described as utilizing a magnet in the form of a rolling pin 64. It will be appreciated, however, and particularly in instruments using short shafts, that the shaft 10', as shown in FIGURE 5, is permanently magnetized and not the pin 64. In such event the same operation would be effected and the groove 12' obviously must be of such a length as to exceed that of the pin 64' cooperating therewith.

There are a number of advantages to the disclosed construction. Increased reliability is obtained through reduced wear and drag of the instrument during normal counting operation. Also, the manufacturing cost is reduced insofar as figure wheel fabrication is concerned and less assembly labor is required.

We claim:

1. A counter mechanism having a drive shaft and a series of non-magnetic counter wheels rotatably mounted on said shaft, means for imparting rotation of said shaft in one direction to one of said wheels and then to the others of said wheels in succession, opposing journal surfaces of said shaft and other wheels having grooves therein extending parallel with said shaft, one of said grooves being in said shaft and being shallow, one other of said grooves being in one of said wheels and being deep, a permanently magnetized cylindrical pin at least partially retained in said deep groove and drawn toward said shaft by magnetic attraction, said shaft groove and one other groove having two surfaces arranged to engage and hold said pin when said one wheel is rotated in one direction relative to said shaft, and a cam surface in said shaft groove arranged to force said pin into said deep groove when said one wheel is rotated in the other direction relative to said shaft.

2. A counter mechanism having a drive shaft and a series of non-magnetic counter wheels rotatably mounted on said shaft, means for imparting rotation of said shaft to said wheels in succession, a deep groove in each of said wheels, a shallow groove in said shaft extending parallel with said wheel grooves and shaft, a cylindrical pin retained in each of said deep grooves, said shallow groove being defined by a cam surface facing a locking surface and being arranged momentarily to receive a portion of each pin as the corresponding wheel rotates on said shaft, and said shaft and pin being magnetically attracted to each other.

3. A counter mechanism having a drive shaft and a series of non-magnetic counter wheels journaled on said shaft, means for normally imparting rotation to said wheels in one direction for counting purposes, a deep groove in the journal surface of one of said wheels, a rolling element in said deep groove and having a diameter less than the depth of said deep groove, a shallow groove in said shaft arranged to connect with said deep groove upon relative rotation of said one wheel and shaft, said shallow groove being defined by a cam surface for urging said rolling element wholly into said deep groove when said one wheel is rotated in said one direction with relation to the shaft and a second surface for cooperating with a surface defining said wheel groove to hold said rolling element when said one wheel is rotated in the other direction with relation to said shaft, and said shaft and rolling element being characterized by mutual magnetic attraction.

4. A counter mechanism as set forth in claim 3, said rolling element being a cylindrical pin and said shallow groove having a depth less than about half of the diameter of said pin.

5. A counter mechanism as set forth in claim 3, a surface of said deep groove being such that, when said shaft and wheel are locked together against relative rotation by said rolling element, a force acting normal to said deep groove rolling element holding surface and passing through the center of said rolling element serves firmly to retain the latter in position in said shallow groove.

6. A counter mechanism as set forth in claim 3, a deep groove being present in a number of said wheels, said rolling element being duplicated for each of the other wheels of said numbered wheels, each of the rolling elements being in the form of a permanently magnetized cylindrical pin, and said drive shaft being of magnetic material.

7. A counter mechanism having a drive shaft and a series of non-magnetic counter wheels rotatably mounted on and in contact with said shaft, means for imparting rotation of said shaft to said wheels in succession and including a deep groove in each of some of said wheels, shallow groove portions in said shaft extending parallel with said shaft and adapted to register with said wheel grooves, a cylindrical pin retained in each of said deep grooves, said pin being of a diameter which is less than the depth of the corresponding wheel groove, said shallow groove portions being partially defined by a cam surface and a locking surface in facing relation, said shaft and the pins being mutually attracted magnetically, and each of said shallow groove portions being arranged to receive a lengthwise portion of the corresponding pin as said wheels are rotated with relation to said shaft.

References Cited by the Examiner
UNITED STATES PATENTS

| | | | |
|---|---|---|---|
| 2,058,056 | 10/1936 | Brubaker et al. | 235—117 |
| 2,300,223 | 10/1942 | Hottenroth | 192—45 |
| 2,554,221 | 5/1951 | Stephenson et al. | 192—45 |
| 2,804,184 | 8/1957 | Bjork | 192—45 |
| 3,000,560 | 9/1961 | Clancy | 235—144 |

LEO SMILOW, *Primary Examiner.*